United States Patent
Liao et al.

(10) Patent No.: US 11,074,426 B1
(45) Date of Patent: Jul. 27, 2021

(54) METHODS AND SYSTEMS FOR MULTI-PART AUTHENTICATION AND TRACKING

(71) Applicant: Applied Materials, Inc., Santa Clara, CA (US)

(72) Inventors: Chien-Min Liao, San Jose, CA (US); Yao-Hung Yang, Santa Clara, CA (US); Hsiu Yang, Santa Clara, CA (US); Jeevan Shanbhag, Cupertino, CA (US); Chun-Chung Chen, San Jose, CA (US); Tom K. Cho, Los Altos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/887,892

(22) Filed: May 29, 2020

(51) Int. Cl.
   *G06K 7/14* (2006.01)
   *G06Q 10/08* (2012.01)
   *H04L 9/06* (2006.01)

(52) U.S. Cl.
   CPC ......... *G06K 7/1417* (2013.01); *G06Q 10/087* (2013.01); *H04L 9/0643* (2013.01)

(58) Field of Classification Search
   CPC ... G06K 7/1417; G06Q 10/087; H04L 9/0643
   See application file for complete search history.

(56) References Cited

U.S. PATENT DOCUMENTS

| | | | |
|---|---|---|---|
| 2003/0040826 A1* | 2/2003 | Hawman | G07C 3/00 700/116 |
| 2009/0248173 A1* | 10/2009 | Sasko | G05B 19/41875 700/9 |
| 2019/0303951 A1* | 10/2019 | Bakalis | G06K 7/10722 |

* cited by examiner

*Primary Examiner* — Matthew Mikels
(74) *Attorney, Agent, or Firm* — Patterson + Sheridan, LLP (57) ABSTRACT

The present disclosure relates to systems and methods for semiconductor tool part tracking and kit verification. Data relating to part identification and performance are encoded to a unique code that is encoded into machine-readable form, such as a data matrix. A multi-dimensional array (MDA) of the data matrices of a group of parts is a 'golden MDA'. When assembled into a kit, the parts are scanned and compared to the golden MDA. If there's a match, a kit unique code is used to generate a kit data matrix. The part data matrix codes are provided to a database to determine if a part combination will cause a coupling effect, based on part usage history.

20 Claims, 7 Drawing Sheets

METHODS AND SYSTEMS FOR MULTI-PART AUTHENTICATION AND TRACKING

BACKGROUND

Field

Embodiments of the present invention generally relate to a system and method for part tracking, and more particularly, to using historical part data to identify coupling effects between parts of a kit.

Description of the Related Art

Operation of a semiconductor manufacturing tool includes a variety of parts that can vary depending upon the manufacturing recipe, conditions under which the recipe is run (e.g., variances in temperature, gas flow rates, power, chemicals used, etc.), and the condition of the tool. Many of these parts require maintenance and/or cleaning due to wear and tear, build up, and depletion of the parts as part of the manufacturing process. To ease the ordering and stocking of parts, tool part manufacturers frequently will provide kits to tool operators, based on the tool, recipe, and recipe conditions.

The process of kit development typically takes place with a technician working with the tool operator, during which the technician will create a kit parts list for the tool operator. The technician will seek to understand the tool for which the kit is being developed, as well as the recipe and operating conditions. The list is subsequently provided to a kit assembly facility, at which a worker obtains parts on the list to assemble the kit, after which the kit is shipped to the tool operator.

Although the worker assembles the kit based on a list of parts, the worker typically doesn't know the provenance of a part that is being placed into a kit. Moreover, they will likely not understand if two particular parts assembled into a kit will cause a coupling effect in the tool operator's environment, due to the tool, recipe, or operating conditions. As a result, a kit assembled with parts that together cause a coupling effect in the tool operator's environment will cause a fault, requiring the attention of a help technician, who will troubleshoot the system to understand the cause of the fault. This process can take weeks of person-hours to discover the fault, during which the tool may be sitting idle, resulting in the waste of this resource.

What is needed are systems and methods to track parts that comprise a kit, and detect parts in a kit that may cause a coupling effect, so that this situation may be remedied before the tool operator installs the parts into the tool.

SUMMARY

The present disclosure relates to systems and methods for semiconductor tool part tracking and kit verification. Data relating to part identification and performance are encoded to a unique code that is encoded into machine-readable forms, such as a data matrix. A multi-dimensional array (MDA) of the data matrices of a group of parts is a 'golden MDA.' When assembled into a kit, the parts are scanned and compared to the golden MDA. If there's a match, a kit unique code is used to generate a kit data matrix. The part data matrix codes are provided to a database to determines if any parts will cause a coupling effect based on usage history.

Embodiments disclosed herein include a system comprising a processor, one or more memories comprising computer-readable instructions which when executed by the processor perform a method for part tracking, the method including scanning a kit code corresponding to a processing kit, decoding the kit code into a plurality of part codes, each part code corresponding to a part composing the processing kit, and providing the plurality of part codes to a part database comprising part coupling data for at least two part codes of the plurality of part codes. The method may further include determining, from the part coupling data for the at least two part codes, if there will be a coupling effect between the parts corresponding to the at least two part codes and displaying coupling effect data on a display, or otherwise notifying a user.

Embodiments disclosed herein include a non-transitory computer-readable storage medium storing instructions for performing a method for part tracking including receiving a kit code corresponding to a processing kit, decoding the kit code into a plurality of part codes, each part code corresponding to a part composing the processing kit, and providing the plurality of part codes to a part database comprising part coupling data for at least two part codes of the plurality of part codes. The method may further include determining, from the part coupling data for the at least two part codes, if there will be a coupling effect between the parts corresponding to the at least two part codes, and displaying coupling effect data on a display.

Embodiments disclosed herein include a method for part tracking including obtaining first part parameters corresponding to a first part and second part parameters corresponding to a second part, generate a first part code that encodes the first part parameters and a second part code that encodes the second part parameters, generate a kit code from the first part code and second part code, and imprinting the first part code on the first part, second part code on the second part, and the kit code on a kit comprising the first part and the second part.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure relates to systems and methods for semiconductor tool part tracking and kit verification. Data relating to part identification and performance are encoded to a unique code that is encoded into machine-readable forms, such as a data matrix. A multi-dimensional array (MDA) of the data matrices of a group of parts is a 'golden MDA'. When assembled into a kit, the parts are scanned and compared to the golden MDA. If there's a match, a kit unique code is used to generate a kit data matrix. The part data matrix codes are provided to a database to determines if any parts will cause a coupling effect based on usage history.

Figure 1:
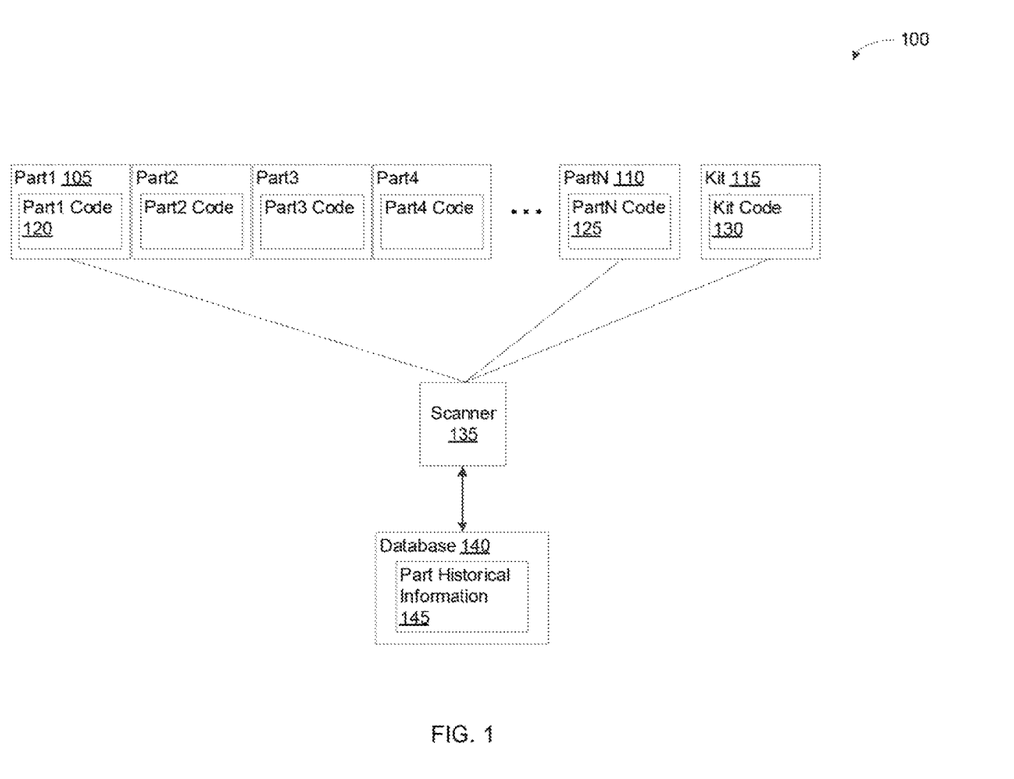
FIG. 1 depicts a system for part tracking according to disclosed embodiments.

FIG. 1 depicts a system 100 for part tracking according to disclosed embodiments.

A part, for example, parts part1 105 through partN 110, may be any type of part used in a semiconductor processing tool, while a kit 115 is a collection of parts. Each part is accompanied by a code, for example, part code1 120 that accompanies part1 105, through partN code 125 that accompanies partN 110.

A part in this context can be any one of a variety of parts used within a semiconductor processing tool, for example, an o-ring, a susceptor, a shield, a lid, a showerhead, a nozzle, a gas line, liners, edge rings, deposition rings, cover rings, shadow frames, lift pins, lift pin guides, heaters, substrate support surfaces, electrostatic chucks, slit valve doors, valves, cabling, pumping plates, cap housings, cap inserts, funnies, or any other type of part suitable for use in a semiconductor processing tool, or component thereof. A part code, such as part code1 120 and partN code 125, comprise a unique representation for a given part and will be discussed in greater detail below. In some embodiments, the part code is machine-readable. For purposes of discussion, a part code in this context comprises part parameter information such as part identification information such as part number, serial number, and manufacturing date, and may also include vendor code, kit number, a part description, or other information known for the identification of a part suitable for use in a semiconductor processing tool. A part code such as part1 code 120 and partN code 125 may further include part parameters relating to part performance information, describing information and data relevant to the performance of a given part. For example, part flatness, thickness, and roughness attributes may be provided, in addition to specification measurements of the provided attributes, the actual measured values of these attributes for the part, and the units of measure for the measured values. The combination of the part identification information, or part identification information and part performance information may comprise a part unique code that makes up the part code. In some embodiments, the part unique code is encoded into a machine-readable representation such as a data matrix, bar code, QR code, RFID chip, symbolic representation such as from the extended ASCII character set, or other formats capable of being received by a machine. In embodiments in which the part performance data is not included in the part unique code, this data may be accessed via a database described below.

The system 100 further comprises the kit 115 and a kit code 130 related to the kit 115. The kit 115 comprises a collection of parts, for example, part1 105 through partN 110. In different embodiments, the number of parts in a kit 115 may be as few as one, and may be as many as twenty parts or more; however, the number of parts in a given kit 115 is limited only by the needs of a customer requesting the kit 115.

The kit 115 comprises a kit code 130, that in some embodiments is machine-readable, as a data matrix, bar code, QR code, RFID, symbolic representation such as from the extended ASCII character set, or other medium. As will be discussed in greater detail below, the kit code 130 comprises a unique kit code comprising a combination of all unique part codes of the parts in the kit 115, as well as additional information unique to the kit, such as a customer identifier, a customer facility identifier, a date on which the kit was assembled, a kit type, a kit serial number, and a decoder section used to inform the system 100 how the unique kit code is hashed, so as to enable another system to decode the unique kit code for further processing.

The system 100 further comprises a scanner 135, capable of reading the part codes and kit code. In some embodiments, the scanner 135 may be a dedicated scanning device such as a data matrix, barcode, QR code, OCR reader, and/or RFID reader, while in other embodiments the scanner 135 may be a multi-use device such as a mobile phone, a tablet computer, a laptop/desktop computer, or other devices capable of reading the machine-readable format of the part code and kit code.

The scanner 135 is coupled to a database 140. Such a coupling may be a direct link (e.g., physical or wireless) between the scanner 135 and a computer system hosting the database 140, while in other embodiments the link may be indirect, such as through one or more intervening computer systems and/or networks, or any combination of direct and indirect links.

The database 140 contains one or more records for each part and each kit. For a part, such as part1 105 through partN 110, the database 140 may comprise part identifying information and part performance data discussed above. In some embodiments, the database additionally comprises part historical information 145.

Part historical information 145, comprises part performance data as described above, in addition to historical part performance data of a part such as part1 105. When a part is first manufactured, its part performance information, including attributes such as electrical characteristics, part flatness, thickness, roughness, hole size, surface finish, dimension measurements (e.g., height, width, thickness), GD&T (geometric dimensioning and tolerancing), or other attributes that may impact the performance of a part, will have an initial value, stored as part historical information 145. As the part is used in a tool and participates in processing activities, its attributes may change due to wear and tear, deposition build-up, and other effects of being installed in a working processing tool. When the part is removed from the tool and sent for cleaning or refurbishment, the facility performing maintenance on the tool may update the part performance attributes with post maintenance measurements. These post maintenance values become part of the part historical information, in addition to updating the current status of the tool by being included in a new part code.

In some embodiments database 140 comprises coupling effect data, that indicates that there may be a coupling effect between two or more identified parts and the conditions in which such a coupling effect may occur. Some conditions may include the two or more parts being installed in the same tool, in the same tool of a particular type, in a tool configured for a particular set of conditions.

By way of example, to achieve homogeneous surface condition on as part of a wafer manufacturing process within a given chamber, process kit parts like lids, showerheads, faceplates, pumping plates, and nozzles will often apply the same coating material. However, the manufacturing processes for coating the same material could be varied due to other considerations such as local manufacturing process step recipe, application methods, and regional supplier practices, and as a result, their performance on the wafer process may not be fully transparent to the part and kit providers. A chamber with either all "coating process A" parts or all "coating process B" parts may not have any condition variation. But there will be condition variation on a chamber with some "coating process A" parts and other "coating process B" parts installed at the same time. This condition variation from process kit parts with mixed manufacturing processes is known as coupling effect. The condition variation could be manifested, for example, as a mismatch on wafer etching/coating uniformity, unwanted particles on a wafer, or other undesirable effect. Moreover, through the lifetime of a part, the surface conditions, thickness, hole sizes, etc., on the part could change due to influence with process gases, plasma, cleaning processes, or even during refurbishment of the part. One part in an earlier stage of its life may have different surface condition than the same part close to its end of life. A combination of new, refurbished, and/or used parts in the same process kit stack could also introduce a condition variation that may result in a coupling effect. For at least these reasons, intentionally choosing part for a given kit, and maintaining integrity of these choices through the process of kit design, part choice, kit assembly, and final kit verification/authentication, increase the likelihood that the kit will perform as expected by the customer.

For example, when part1 105 is new, its part code1 120 has part performance attributes corresponding to its new condition. When part1 120 is cleaned, refurbished, or otherwise maintained, when its part performance attributes are updated, part code1 120 is updated to reflect the updated part performance attributes.

In addition to storing part performance attributes over the lifetime of a part, part historical information 145 may store information about the tool that a part is installed in as well as identify other parts installed in that tool at the same time, in addition to the tool configuration. By maintaining tool composition and configuration, the database 140 may serve to identify parts that, when placed in the same tool, cause a 'coupling effect' (e.g., cause process drift, particle contamination or other undesirable effect) as discussed above.

Figure 2:
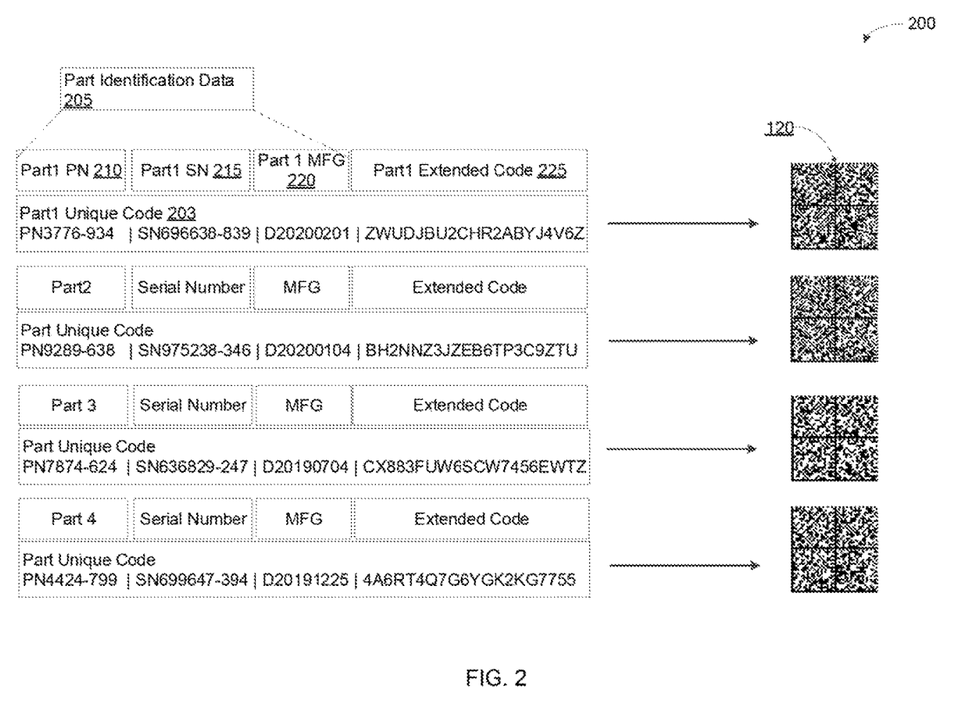
FIG. 2 depicts encoded part data according to disclosed embodiments.

FIG. 2 depicts encoded part data 200 according to disclosed embodiments. Encoded part data describes the components of the part code, such as part1 code 120 through partN code 125. In the depicted embodiment, part code1 120 is a Datamatrix code, and other embodiments are contemplated as described above.

A part1 unique code 203 used to generate part1 code 120 is comprised of a number of components. Part identification data 205 in some embodiments is comprised of a part number (PN) such as Part1 PN 210, a serial number (SN) such as Part1 SN 215, and a manufacturing date (MFG) such as Part 1 MFG 220. In some embodiments, part identification data 205 may include additional information suitable for identifying a part, such as a vendor ID, kit number, a part description, or other information capable of identifying a part. Part1 unique code 203 further comprises an extended code, for example, part1 extended code 225. Part1 extended code 225 in some embodiments is a compressed or encrypted form of the part identification data 205, and in some embodiments, includes part performance data described above (not shown). In embodiments that do not include part performance data, such data may be accessed from a database such as database 140.

In some embodiments, part1 extended code 225 of the part1 unique code 203 is used to generate the part1 code 120. In embodiments in which part1 code 120 is a Datamatrix code, generated for example, using the ECC200 Datamatrix algorithm or a version of that algorithm. Where part1 code 120 is a barcode, RFID, or other machine-readable format, an appropriate encoding algorithm may be utilized. In other embodiments, elements of the part identification data 205 present in the part1 unique code 203 may additionally be utilized to generate the part1 code 120.

Figure 3:
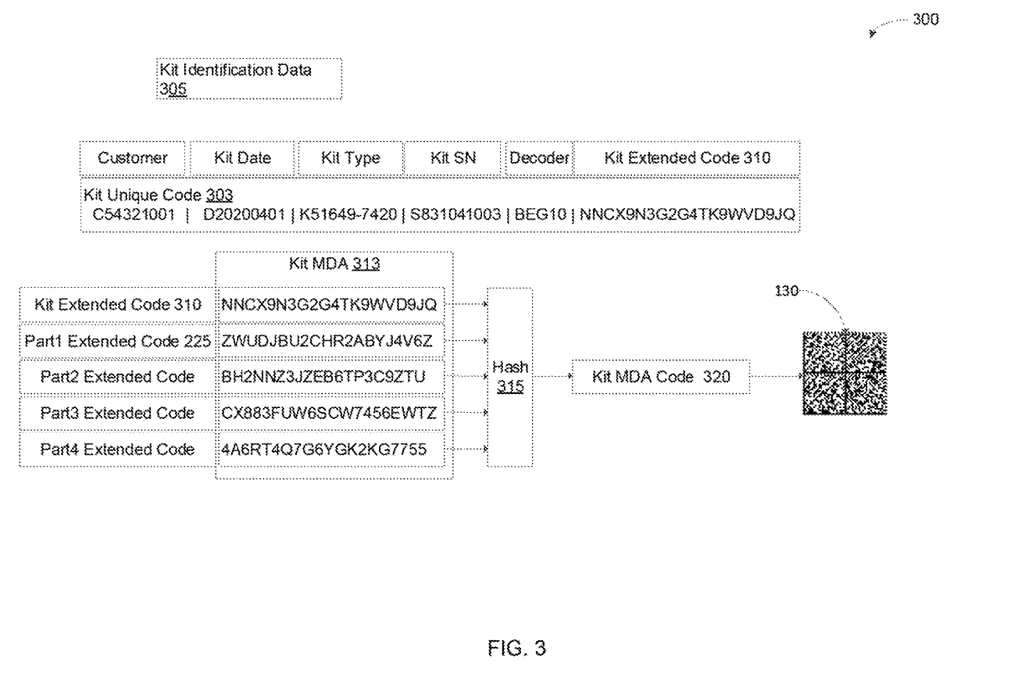
FIG. 3 depicts encoded kit data according to disclosed embodiments.

FIG. 3 depicts the encoding of kit data 300 according to disclosed embodiments. Similar to part codes discussed above, the generation of kit code 130 begins with developing a kit unique code 303. Kit unique code is comprised of kit identification data 305, which may include data to identify a customer and/or a customer facility, kit assembly date, kit type, kit SN, and a kit decoder. The kit decoder is used to inform a receiving system as to the compression or encryption used to generate a kit extended code 310. Kit unique code 303 further comprises the kit extended code 310, which in some embodiments is a compressed or encrypted form of the kit identification data 305, and in other embodiments could include kit performance data or other data elements.

A kit multi-dimensional array (MDA) 313 comprised of the kit extended code 310 and the part extended codes of all parts of the kit. To form a kit MDA code 320, the kit extended code 310 of the kit unique code 303 is combined with the extended codes of the parts that make up the kit via a hash function such as a hash 315. The kit MDA code 320, is processed to form the kit code 130 as described elsewhere herein. In some embodiments hash 315 comprises hashing the extended codes of the kit and parts based on one or more of a customer ID, a factory ID, a time, and a number of parts in the kit represented by kit code 130. It is understood that other values may be employed by hash 315 to compress or otherwise encrypt the kit MDA 313 values.

Figure 4:
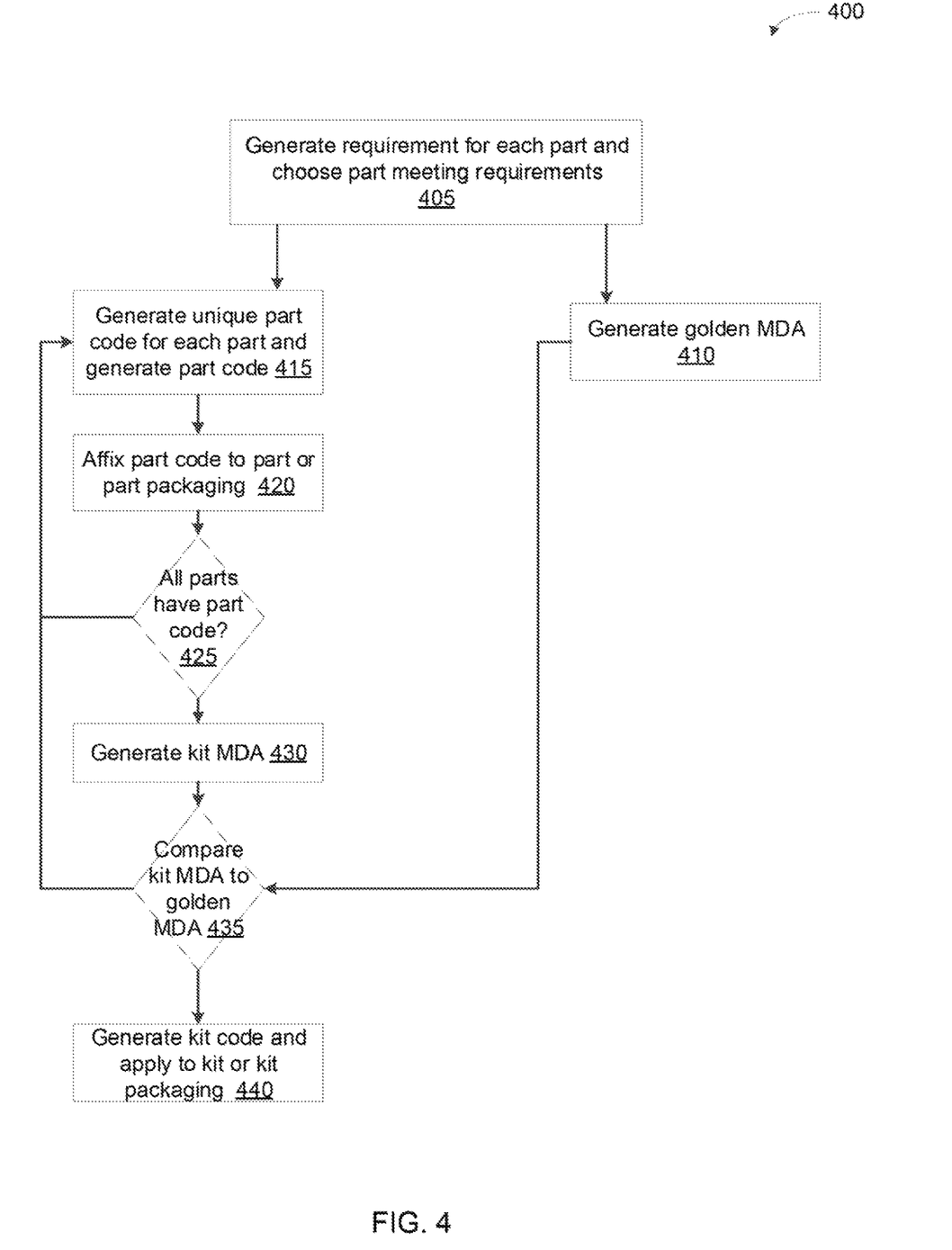
FIG. 4 depicts a process for kit assembly, according to disclosed embodiments.

FIG. 4 depicts a process 400 for kit assembly, according to disclosed embodiments.

At 405 the process 400 generates requirements for each part going into a kit, based on customer needs, customer tools, customer tool configurations, and other parameters appropriate for configuring a kit for the processing of semiconductor devices. In some embodiments, particular parts are chosen within a parts inventory that meets this requirement. A list of parts is generated and provided to an inventory warehouse for fulfillment.

At 410, a golden MDA is generated based on the parts designated in 405. The golden MDA may be comprised of the extended codes of the parts identified.

At 415, the list of parts is used to generate a part code, such as in a manner described above, for each part identified. The identified part is retrieved from the inventory warehouse and its part code is scanned. The scanned part code is generated in a physical medium (e.g., a machine-readable Datamatrix label), and at 420 the part code is affixed to the appropriate part, or part packaging.

At 425 a check is performed to verify that all parts in the kit have a part code. If not, the process goes back to 415 for the generation of a part code.

At 430, a kit MDA is generated in the manner described above, using the extended codes from the parts of the kit, in addition to kit information. At 435 The kit MDA is compared to the golden MDA. If the kit MDA and golden MDA indicate the correct parts are present, the process continues, otherwise goes back to 415. If there has been an error in the part retrieved from the inventory warehouse, this will error be identified.

At 440 the kit MDA is used to generate the kit code, and the kit code is affixed to the kit and/or kit packaging.

Figure 5:
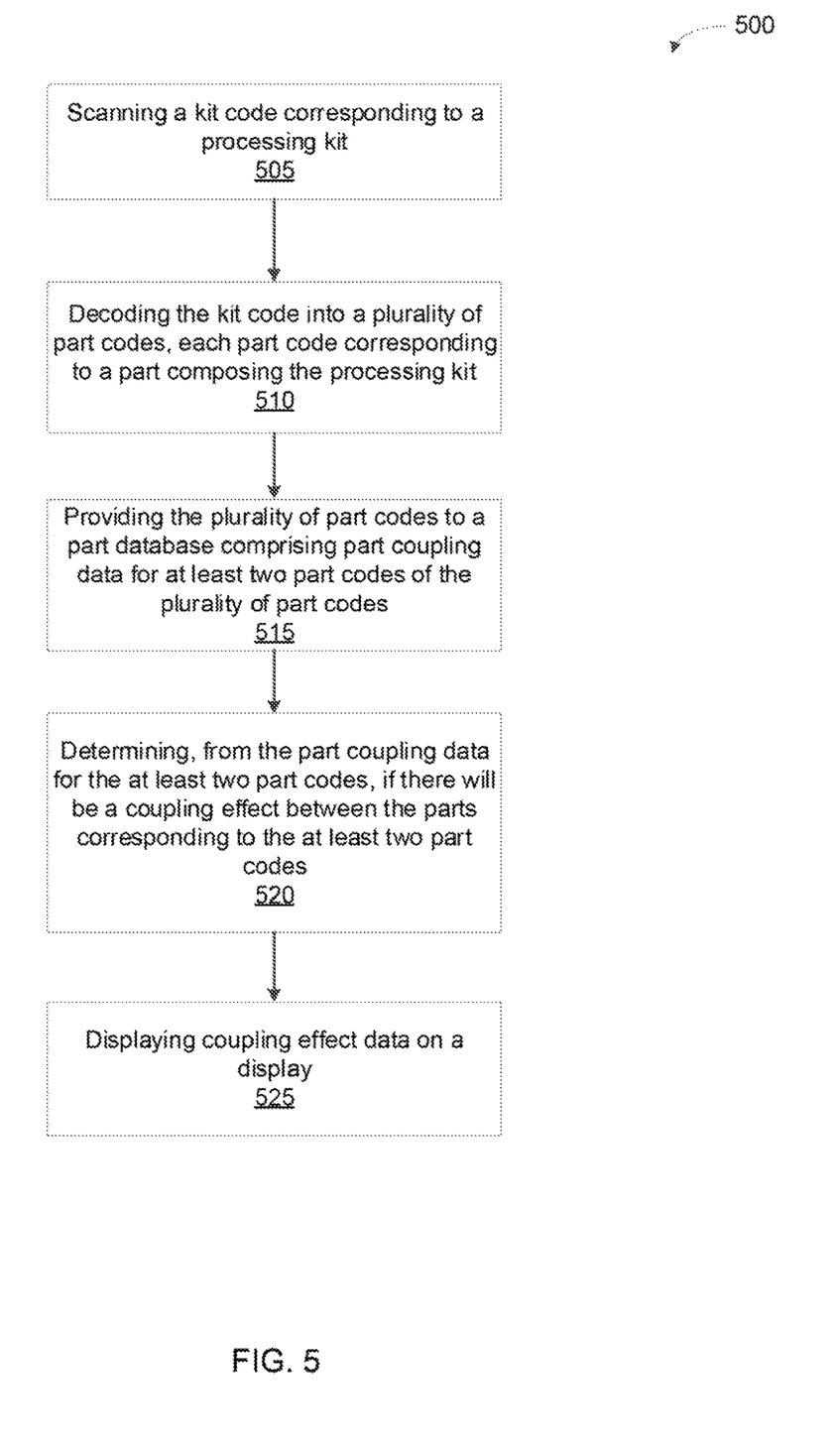
FIG. 5 depicts a method for detecting a coupling effect between parts of a kit, according to disclosed embodiments.

FIG. 5 depicts a method 500 for detecting a coupling effect between parts of a kit, according to disclosed embodiments.

At 505, the method scans a kit code corresponding to a processing kit, while at 510 the method decodes the kit code into a plurality of part codes, each part code corresponding to a part composing the processing kit. In some embodiments, each part code of the plurality of part codes comprises part identification data and part performance data, which in some embodiments is encrypted. In some embodiments, each part code of the plurality of part codes is placed in an array. In some embodiments, the array is encoded to generate the kit code, while in other embodiments, the kit code is a data-matrix code.

At 515 the method 500 provides the plurality of part codes to a part database comprising part coupling data for at least two part codes of the plurality of part codes. Additionally, at 520 the method determines from the part coupling data for the at least two part codes, if there will be a coupling effect between the parts corresponding to the at least two part codes. At 525, the method displays coupling effect data, if any on a display to a user, to inform the user of a coupling effect.

Figure 6:
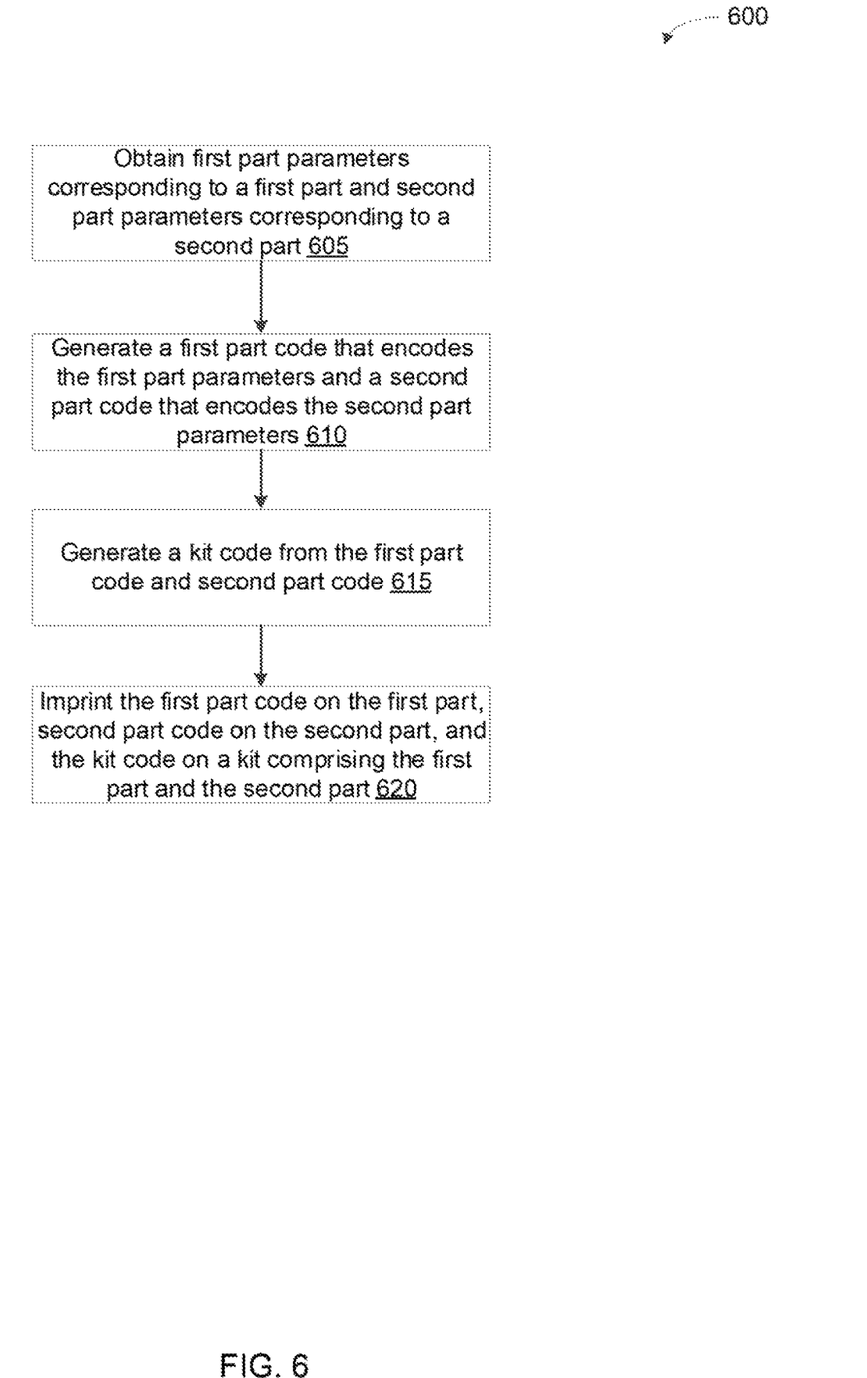
FIG. 6 depicts a method for developing part codes and kit codes, according to disclosed embodiments.

FIG. 6 depicts a method 600 for developing part codes and kit codes, according to disclosed embodiments.

At 605 the method 600 obtains first part parameters corresponding to a first part and second part parameters corresponding to a second part, and at 610 generates a first part code that encodes the first part parameters and a second part code that encodes the second part parameters. In some embodiments, the first part code and second part code comprise at least one of a part number and a serial number corresponding to one of the first part and second part, and at least one part performance parameter corresponding to one of the first part and second part. Further embodiments may include that the kit code comprises at least one of a kit type, a kit serial number, and a kit date. In some embodiments include creating a first hash from the first part code and second hash from the second part code, wherein the multi-dimensional array is comprised of the first hash and the second hash.

At 615 the method 600 generates a kit code from the first part code and the second part code and at 620 imprints the first part code on the first part, the second part code on the second part, and the kit code on a kit comprising the first part and the second part.

Further embodiments of method 600 include a golden MDA that is generated from the first part parameters and second part parameters and authenticating the kit code from the golden MDA.

Figure 7:
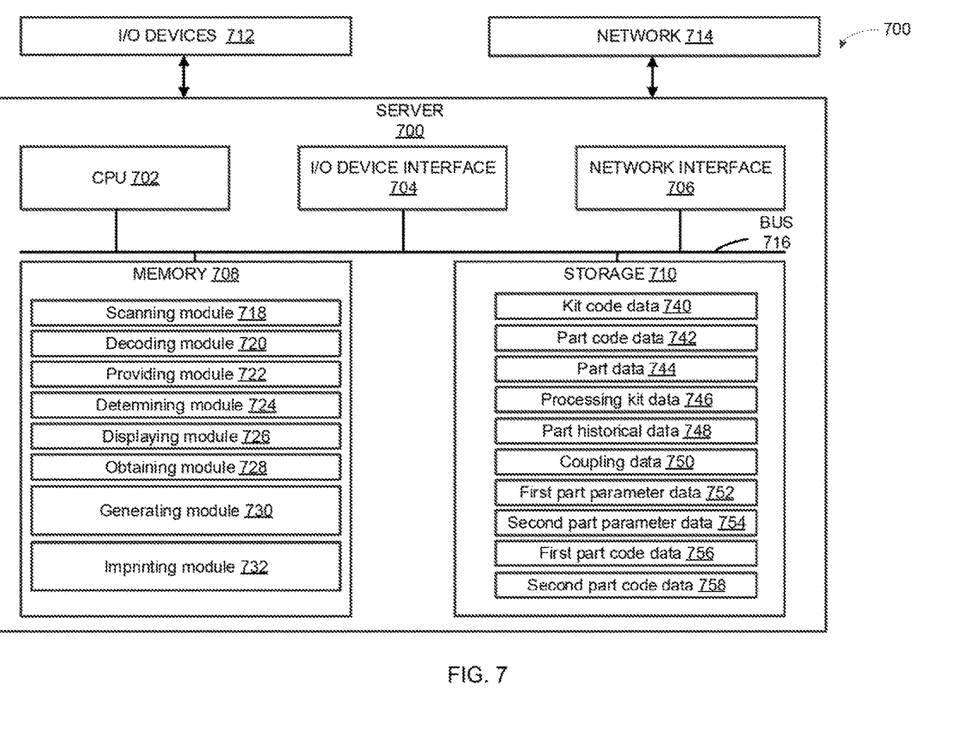
FIG. 7 depicts a processing system for part tracking and coupling effect detection, according to disclosed embodiments.

FIG. 7 depicts a processing system 700 for part tracking and coupling effect detection, according to disclosed embodiments that may perform the methods described herein, such as the method described in connection with FIGS. 1-6.

Server 700 includes a central processing unit (CPU) 702 connected to a data bus 716. CPU 602 is configured to process computer-executable instructions, e.g., stored in memory 708 or storage 710, and to cause the processing system 700 to perform methods described herein. CPU 702 is included to be representative of a single CPU, multiple CPU's, a single CPU having multiple processing cores, distributed CPU(s) as a resource in a cloud computing environment, and other forms of processing architecture capable of executing computer-executable instructions.

Processing system 700 further includes input/output (I/O) device(s) 712 and interfaces 704, which allows processing system 700 to interface with I/O devices 712, such as, for example, keyboards, scanners, displays, mouse devices, pen input, and other devices that allow for interaction with processing system 700. Note that processing system 700 may connect with external I/O devices through physical and wireless connections.

Processing system 700 further includes a network interface 706, which provides processing system 700 with access to external network 714 and thereby external computing devices.

Processing system 700 further includes memory 708, which in this example includes a scanning module 718, a decoding module 720, a providing module 722, a determining module 724, a displaying module 726, an obtaining module 728, a generating module 730, and an imprinting module 732 for performing operations described in FIGS. 1-6.

Note that while shown as a single memory 708 in FIG. 7 for simplicity, the various aspects stored in memory 708 may be stored in different physical memories, including memories remote from processing system 700, but all accessible by CPU 702 via internal data connections such as bus 716.

Storage 710 further includes kit code data 740, part code data 742, part data 744, processing kit data 746, part historical data 748, coupling data 750, first part parameter data 752, second part parameter data 754, first part code data 756, and second part code data 758, as described in connection with FIGS. 1-6.

While not depicted in FIG. 7, other aspects may be included in storage 710.

As with memory 708, a single storage 710 is depicted in FIG. 7 for simplicity, but various aspects stored in storage 710 may be stored in different physical storages, but all accessible to CPU 702 via internal data connections, such as bus 716, or external connection, such as network interfaces 706. One of skill in the art will appreciate that one or more elements of the processing system 700 may be located remotely and accessed via a network 714.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general-purpose processor, a digital signal processor (DSP), an application-specific integrated circuit (ASIC), a field-programmable gate array (FPGA) or other programmable logic devices (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates the transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer-readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During the execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

While the foregoing is directed to embodiments of the present disclosure, other and further embodiments of the disclosure may be devised without departing from the basic scope thereof, and the scope thereof is determined by the claims that follow.

What is claimed is:

1. A method for part tracking comprising:
   scanning a kit code corresponding to a processing kit;
   decoding the kit code into a plurality of part codes, each part code corresponding to a part composing the processing kit;
   providing the plurality of part codes to a part database comprising part coupling data for at least two part codes of the plurality of part codes;
   determining, from the part coupling data for the at least two part codes, that there is a coupling effect between the parts corresponding to the at least two part codes, the coupling effect comprising a condition variation during a semiconductor manufacturing operation; and
   displaying coupling effect data on a display.

2. The method of claim 1 wherein each part code of the plurality of part codes comprises part identification data and part performance data.

3. The method of claim 2 wherein the performance data is encrypted.

4. The method of claim 2 comprising placing each part code of the plurality of part codes in an array.

5. The method of claim 4 further comprising encoding the array to generate the kit code.

6. The method of claim 5 wherein the kit code is a data-matrix code.

7. The method of claim 1 wherein determining if there will be a coupling effect comprises:
   parsing historical use data associated with the at least two part codes;
   displaying coupling effect data when the historical use data indicates a coupling effect.

8. A non-transitory computer-readable storage medium storing instructions for performing a method for part tracking comprising:
   receiving a kit code corresponding to a processing kit;
   decoding the kit code into a plurality of part codes, each part code corresponding to a part composing the processing kit;
   providing the plurality of part codes to a part database comprising part coupling data for at least two part codes of the plurality of part codes;
   determining, from the part coupling data for the at least two part codes, if there will be a coupling effect between the parts corresponding to the at least two part codes, the coupling effect comprising a condition variation during a semiconductor manufacturing operation; and
   displaying coupling effect data on a display.

9. The storage medium of claim 8 wherein each part code of the plurality of part codes comprises part identification data and part performance data.

10. The storage medium of claim 9 wherein the performance data is encrypted.

11. The storage medium of claim 9 comprising placing each part code of the plurality of part codes in an array.

12. The storage medium of claim 11 further comprising encoding the array to generate the kit code.

13. The storage medium of claim 12 wherein the kit code is a data-matrix code.

14. The storage medium of claim 8 wherein determining if there will be a coupling effect comprises:
   parsing historical use data associated with the at least two part codes;
   displaying coupling effect data when the historical use data indicates a coupling effect.

15. A method for part tracking comprising:
   obtaining first part parameters corresponding to a first part and second part parameters corresponding to a second part;
   generating a first part code that encodes the first part parameters and a second part code that encodes the second part parameters;
   providing the first part code and second part code to a part database comprising part coupling data for the first part code and second part code;
   determining from the part coupling data of the first part code and second part code if there will be a coupling effect between parts corresponding to the first part code and second part code, the coupling effect comprising a condition variation during a semiconductor manufacturing operation;
   generating a kit code from the first part code and second part code; and
   imprinting the first part code on the first part, second part code on the second part, and the kit code on a kit comprising the first part and the second part.

16. The method of claim 15 wherein the first part code and second part code comprise at least one of a part number and a serial number corresponding to one of the first part and second part, and at least one part performance parameter corresponding to one of the first part and second part.

17. The method of claim 16 wherein the kit code comprises at least one of a kit type, a kit serial number, and a kit date.

18. The method of claim 16 further comprising creating a first hash from the first part code and second hash from the second part code, wherein the kit code is comprised of the first hash and the second hash.

19. The method of claim 15 wherein a golden MDA is generated from the first part parameters and second part parameters.

20. The method of claim 19 further comprising authenticating the kit code from the golden MDA.

* * * * *